United States Patent
Reichardt et al.

[11] Patent Number: 6,047,890
[45] Date of Patent: Apr. 11, 2000

[54] CONTACT BLOCK FOR A SMART CARD READER

[75] Inventors: Manfred Reichardt, Weinsberg; Bernd Schuder, Schwaigern, both of Germany

[73] Assignee: Amphenol-Tuchel Electronics GmbH, Heilbronn, Germany

[21] Appl. No.: 09/019,716

[22] Filed: Feb. 6, 1998

[30] Foreign Application Priority Data

Feb. 7, 1997 [DE] Germany .......................... 197 04 592

[51] Int. Cl.$^7$ .................................... G06K 7/06
[52] U.S. Cl. ............................................ 235/441
[58] Field of Search .................... 235/492, 441, 235/451, 486, 439, 485; 902/26; 361/737; 439/188–189

[56] References Cited

U.S. PATENT DOCUMENTS 4,976,630 12/1990 Schuder et al. .
5,718,609 2/1998 Braun et al. .

FOREIGN PATENT DOCUMENTS

| 0 316 699 | 5/1989 | European Pat. Off. . |
| 2 685 967 | 2/1994 | France . |
| 38 10 275 | 10/1989 | Germany . |
| 41 18 312 | 3/1995 | Germany . |
| 44 11 345 | 5/1995 | Germany . |

*Primary Examiner*—K. P. Hantis
*Attorney, Agent, or Firm*—Bacon & Thomas

[57] ABSTRACT

A contact block for a smart card reader includes a plurality of contacts having first ends electrically connected to a printed circuit, and portions arranged to project beyond a surface of a contacts carrier and engage terminals of the smart card when the smart card is in an end position. A one piece switching contact also includes a portion that projects beyond the surface of the contacts carrier, the projecting portion extending into a path of the smart card to be engaged and moved by the smart card as the smart card is moved to the end position. A second portion of the one piece switching contact faces the printed circuit and is moved into engagement with a conductive path of the printed circuit as a result of engagement and movement of the first portions of the switching contact in response to movement of the smart card into the end position.

9 Claims, 2 Drawing Sheets

CONTACT BLOCK FOR A SMART CARD READER

BACKGROUND OF THE INVENTION

1. Field of the Invention

The invention concerns a contact block for a smart card reader. The contact block comprises a contacts carrier and contacts disposed therein. The contacts are formed having a first end for contacting corresponding conducting paths of a printed circuit associated with the contact block and second free end beyond the surface of the contacts carrier to face an associated smart card.

2. Description of Related Art

Contact blocks of the type with which the invention is concerned as well as associated smart card readers and smart cards are known from the prior art (DE 41 18 312 C2; DE 44 11 345 C1).

Smart card readers have the purpose of contacting the contacts of the electronic chip disposed on an associated card, in a certain (end) position of the card within the reader in order to enable a "reading" of information stored in the chip, and to enable as well an input of information to the smart card.

Smart card readers of the said type are employed in stationary chip-card telephones, mobile phones, automatic cash dispensers and the like, for example.

The electrical connection of the contacts of the chip to the contacts of the contact block is reported through an "end position switch", which, according to DE 38 10 275 A1, comprises two spring contacts, one of which is actuated by collision with an associated frame shortly after the smart card reaches the end position within the reader (reading position).

From EP 0 316 699 A1 a contact switch is known, forming a slide-in end contact. Normally, the contacts face each other at their contact ends, one contact arm engaging the other under bias. In inserting a card into the smart card reader the card is guided against the end position switch until the contact arms disengage from each other. At that moment, the card is in the end position and is activated.

In DE 44 11 345 C1 mentioned above, the contact switch is manufactured as follows the contact elements are formed first together (that is in one piece) of an electrically conductive material, and then brought into the desired coordination and afterwards positioned in a contacts holder before they are separated from each other materially and thus electrically. Originating from an initially one-piece contact switch, the switch contacts are separated only in the mounting position, out as a result, the contact switch is of two pieces again.

Because of the large scale manufacturing of the smart card readers employed today, there is a continuous need to simplify and thus to make the production of the reader and its components less expensive.

SUMMARY OF THE INVENTION

The invention provides a contact block for a smart card reader, the switching contact of which is of one piece, whereby several advantages are achieved at the same time, namely:

the second contact spring is avoided
in this way, the contact block may be formed smaller, so that space is reduced on an associated circuit board
the mounting of the contact block is simplified.

The contact switch—like the other contacts of the contact block—is positioned having one end in the contacts carrier and is otherwise disposed in the contacts carrier in such a manner that the a portion of the switching contact projects beyond the contact block—like the other contacts—that is on the same side as the other contacts. In order to be able to perform the switching function, the first (mounting) end of the switching contact—analogous to the other contacts—is brought into contact with a conducting path of the associated printed circuit and the portion extending between the contact ends is formed and guided in the contacts carrier to be brought into contact with a conducting path of the printed circuit during engagement between the contacts of the smart card and the other contacts of the contact block.

In other words: the contact switch of the contact block according to the invention has three functional regions:

The first end which is electrically connected to a conducting path of the printed circuit.

The second (free) end which is pushed by the inserted smart card and moves the switching contact towards the printed circuit.

A middle portion which, with the moving of the switching contact by the smart card, is guided against a conducting path of the printed circuit and thus establishes an electrical connection to the first end of the switching contact or disconnects it, depending on whether the middle portion contacts the same conducting path as the first end or another conducting path functionally associated with the conducting path of the first end.

The fundamental advantage with respect to the prior art is that the functional position of the smart card may be indicated and activated by a one-piece contact switch (switching contact). The card may be pushed from the side onto the contacts or guided from the top onto the contacts.

Accordingly, the invention in its most general embodiment concerns a contact block for a smart card reader having the following features:

The contact block consists of a contacts carrier and contacts disposed therein, the contacts are formed having a first end for contacting corresponding conducting paths of a printed circuit associated with the contact block, a portion of each contact projects beyond the surface of the contacts carrier and faces an associated smart card, a contact serving as a switch is positioned in the contacts carrier in such a manner that a portion extending between the contact ends is brought into contact with a conducting path of the printed board during bringing of the contacts of the smart card into contact with the other contacts of the contact block.

Particularly efficient manufacturing may be achieved in that all contacts are aligned parallel to each other. In this case, all contacts (including the switching contact) may be mounted identically in the contacts carrier at their first end which is associated functionally to the conducting paths of the printed circuit. Here, the respective first ends of the contacts may be bent in a U-shape, for example, the free leg end resting against the corresponding conducting path.

With the switching contact, this may be performed for example in that the first end of the switching contact is in a U-shape and the free leg of the U-shape projects beyond the contacts carrier, extending parallel to the contacts carrier.

Since the contacts of the contact block which serve for contacting the contacts of the smart card may be mounted more or less fixedly in the contacts carrier at their middle portion, the contact switch has otherwise to be guided movably in the contacts carrier in order to be able to perform the desired switching function.

For that, an embodiment of the invention provides that the switching contact except its first end is guidable in the contacts carrier within a groove extending perpendicularly to the contacts carrier surfaces. This portion of the switching contact may thus be moved perpendicularly to the surfaces of the contacts carrier.

According to another embodiment, the groove is formed continuously at least in the region of the middle portion of the switching contact between the contact surfaces of the contacts carrier. In this manner, it is ensured that the middle portion of the switching contact may be guided beyond the surface of the contacts carrier facing the printed circuit, in order to contact a corresponding conducting path.

In order to enable this contact while making the switching distance as short as possible, another embodiment provides that the contact portion of the switching contact is molded (arched) towards the printed circuit. Correspondingly, the switching contact may be guided within the contacts carrier in such a manner that "normally" the molded middle portion is directly before the surface of the contacts carrier facing the printed circuit. In inserting a smart card, the smart card is guided against the free (second) end of the switching contact and presses that end towards the contacts carrier, the middle portion of the contact being moved beyond the surface of the contacts carrier and guided against an associated conducting path at the same time.

If both the first end of the switching contact and the middle portion of the switching contact act upon the same conducting path, the end position of the smart card (in which the contacts of the smart card rest against the free second ends of the contacts of the contacts carrier) is indicated by a short circuit in the region of the corresponding conducting path of the printed circuit.

It is also possible to bring the middle portion of the switching contact into contact with a separate conducting path connected functionally (electrically) to the conducting path of the first contact end of the switching contact to indicate and to activate the end position (switching position), accordingly.

Further characteristics of the invention follow from the features of the subclaims and the other application documents.

These also include an embodiment in which the second (free) end of the switching contact rests under small bias against a counter bearing serving on the one hand for positioning the switching contact and on the other hand for reducing the switching distance of the switching contact.

BRIEF DESCRIPTION OF THE DRAWINGS

In the following, the invention is explained in more detail with an embodiment. The Figures show.

DETAILED DESCRIPTION OF THE PREFERRED EMBODIMENTS

Figure 1:
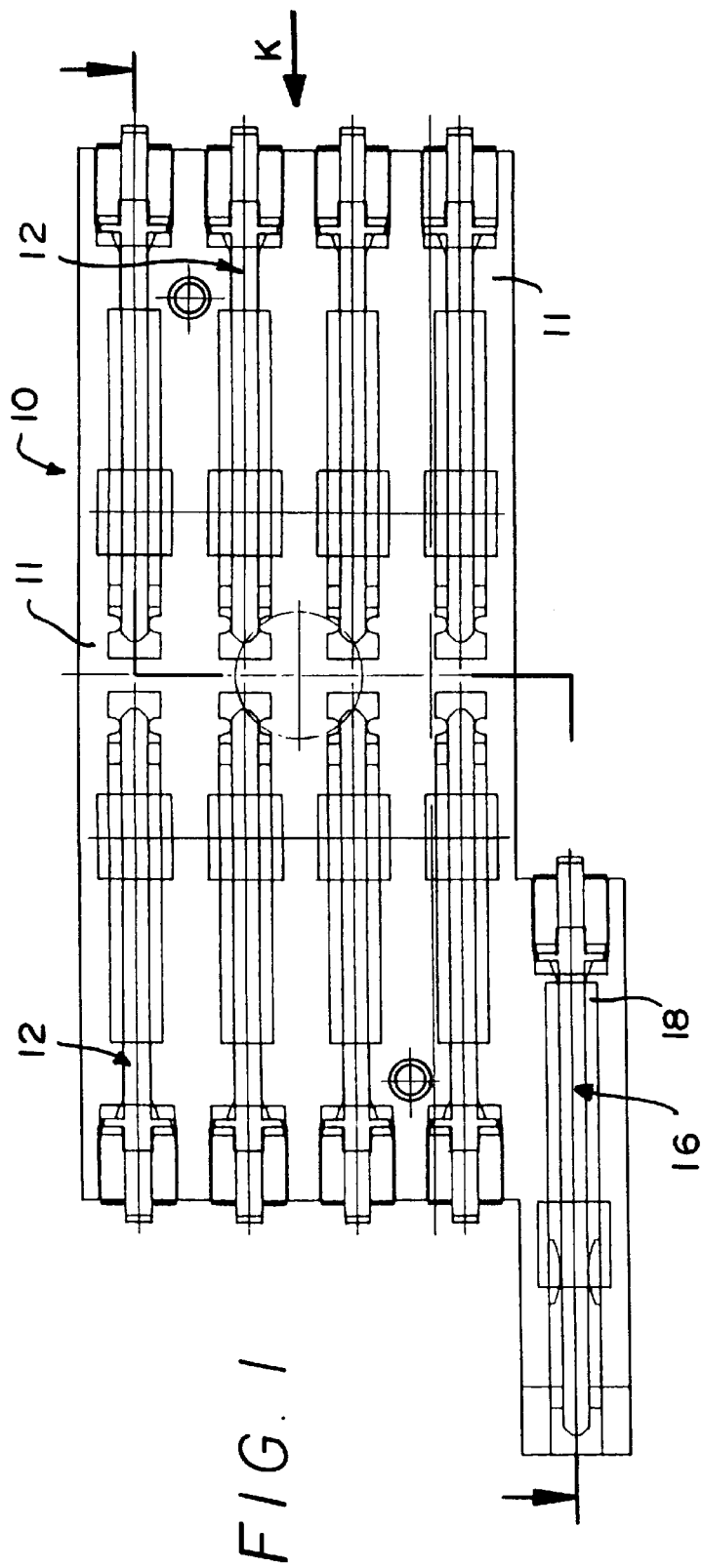
FIG. 1 a plan view of a contact block according to the invention.

In FIG. 1, a contacts carrier of a contact block 10, formed as an insulating body of plastic is represented at the reference number 11. Here, eight contacts 12 are disposed in said contacts carrier 11, the contacts 62 being also shown in FIG. 3, that is in two rows having four contacts 12 each.

Figure 3:
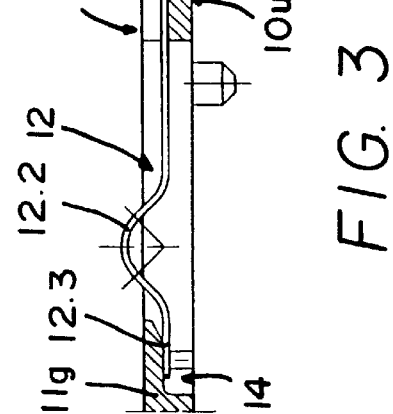

The contacts 12 have a first end 12.1 being bent in U-shape, that is in such a manner that the free leg 12u extends parallel to the lower surface of the insulating body (contacts carrier) 11 of the contact block 10 and projects beyond the lower surface 10u (FIG. 3).

As FIG. 3 shows—the further course of the contacts 12 within the contacts carrier 11 is as follows: the contacts 12 are arched upwardly in a middle portion 12.2 and rise above the upper surface 10o of the contacts carrier 11. The free second end 12.3 is held under bias under a portion 11g of the contacts carrier 11, serving as counter bearing. The region below the counter bearing 11g is cut out (region 14) so that the contacts 12 and especially their middle portion 12.2 is guided springily towards the lower surface 10u of the contacts carrier 11.

Figure 2:
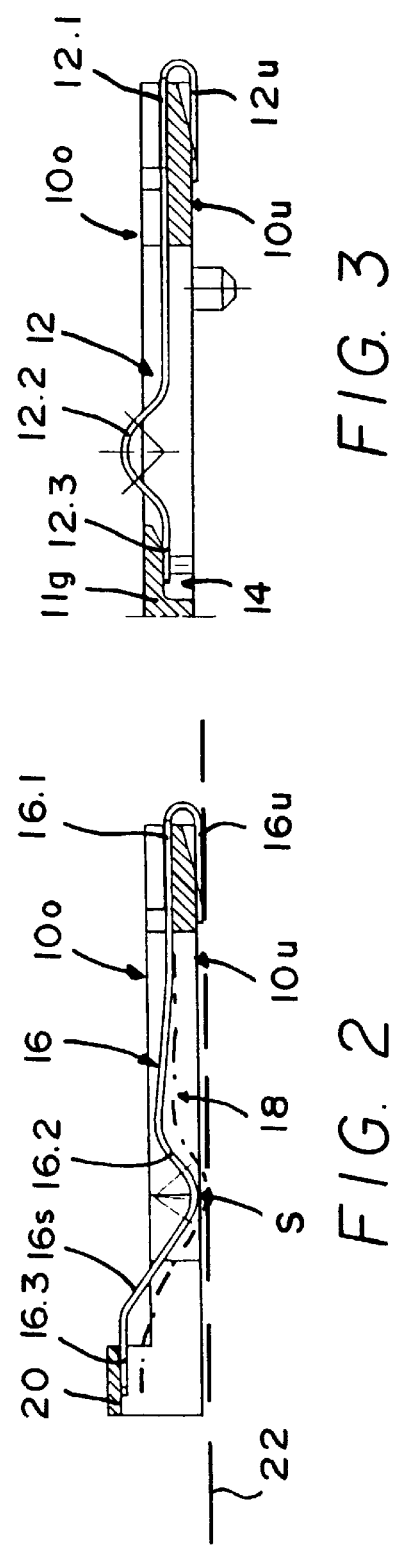
FIG. 2 a vertical section through the portion of the contact block according to FIG. 1, being formed with a switching contact, FIG. 3 a vertical section through the portion of the contact block according to FIG. 1, being formed with another contact, FIG. 4 a vertical on through a contact block having a switching contact designed differently with respect to FIG. 2.

FIG. 1 shows that, beside the said eight contacts 12, another contact 16 is disposed slightly offset from the contacts 12 but parallel to them in the contacts carrier 11. Said contact 16 forms a switching contact and its arrangement and function are illustrated in FIG. 2, as follows:

A first end 16.1 is formed analogous to the first end 12.1 of the contacts 12 and said end is fixed in the contacts carrier 11 corresponding to the contact ends 12.1 so that we can refer to the explanations above.

Coming from said first end 16.1, the switching contact extends to its opposite free end 16.3 within a groove 18 formed within the contacts carrier 11, extending between the surfaces 10o, 10u of the contacts carrier 11.

The middle portion 16.2 of the contact 16 is formed to extend towards the lower surface 10u of the contacts carrier 11, that is exactly in the direction opposite to the middle portion 12.2 of the contacts 12.

Also exactly opposite to the second (free) contact ends 12.3 of the contacts 12, the free contact end 16.3 of the switching contact 16 rests against a counter bearing 20, above the upper surface 10o of the contacts carrier 11, the contact 16 being formed with a slope 16s between the middle portion 16.2 and the free end 16.3.

In the "normal position" represented in FIG. 2 by continuous lines, the vertex S of the molded middle portion 16.2 of the contact is at a little distance from the lower surface 10u of the contacts carrier 11, while the free end 16.3 rests against the counter bearing 12, the contact 16 as a whole being held under bias in the contacts carrier 11.

If the smart card (not illustrated) is inserted in the direction of the arrow K (FIG. 1), the leading edge of the smart card presses, shortly before its end position, against the slope 16s of the switching contact 16 and presses the middle portion 16.2 beyond the lower surface 10u of the contacts carrier 11, while at the same time the free end 16.3 of the switching contact 16 is removed from the counter bearing 20. The position of the switching contact reached in this way is illustrated schematically in a dot-dash line in FIG. 2. After a short further slide-in distance, the smart card abuts the wall in the region of the counter bearing 20 and has reached its end position.

In the said position, the contacts of the smart card rest against the arched regions 12.2 of the contacts 12 and contact them.

The electrical contacting of this (mechanical) contact position is carried out via the portion 16.2 of the switching contact 16, when this portion 16.2 is pressed by the smart card beyond the lower surface 10u of the contacts carrier 11.

At that moment, the portion 16.2 is brought into contact with an associated conducting path (not illustrated) of a printed circuit 22, which is illustrated schematically by a broken line in FIG. 2.

In the embodiment illustrated herein, the portion 16.2 contacts the same conducting path on which the free leg 16u of the switching contact 16 is resting so that a short circuit is caused accordingly, which indicates the end position of the smart card and provides the electrical connection of the contacts of the smart card and the contacts 12 to the corresponding conducting paths of the printed circuit on which the contacts 12 are resting with their free ends 12u.

Because of bias of the switching contact 16, in pulling-out the card, the contact position of the portion 16.2 with the conducting path is again released and the switching contact 16 then occupies again its "normal position"(non-functional position) illustrated in FIG. 2.

Figure 4:
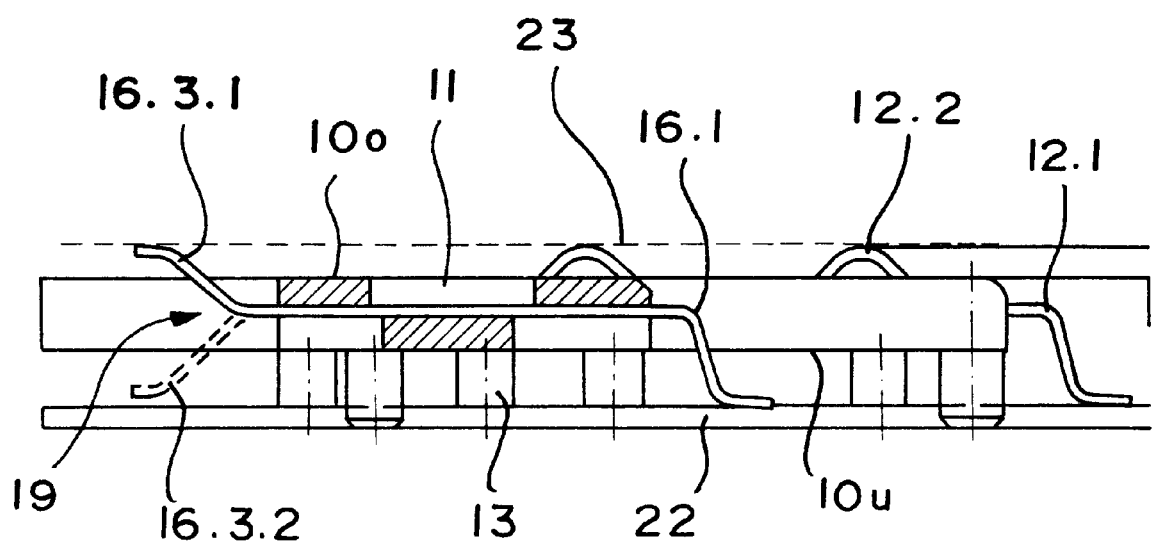

FIG. 4, another embodiment of a contact block according to the invention is illustrated.

The contact block 11 is mounted on a circuit board (printed circuit) 22 via feet 13.

The respective first ends 12.1, 16.1 of the contacts 12, 16 are bent in L-shape, the free ends being soldered onto corresponding conducting paths of the circuit board 22.

The switching contact 16 extends from the first end 16.1 through the contacts carrier 11 essentially parallel to the surfaces 10o, 10u of the contacts carrier 11 and projects with its second end 16.3 into a corresponding recess 19 of the contacts carrier 11. This end 16.3 of the switching contact 16 is divided in the longitudinal direction of the switching contact 16, a first portion 16.3.1 being bent upwardly in S-shape and a second portion 16.3.2. being bent downwardly in S-shape.

As can be seen from FIG. 4, the upper portion 16.3.1 again projects beyond the upper surface 10o of the contacts carrier 11 (analogous to the portions 12.2 of the contacts 12) and the lower portion 16.3.2 is formed with its free rounded end being at a small distance from the circuit board 22, when no smart card is inserted.

If the smart card (illustrated schematically by the dashed line 23 in FIG. 4) is guided onto the contacts 12, 16 or the corresponding contact portions 12.2, 16.3.1, this causes the contact end 16.3.1 to be guided downwardly (towards the contacts carrier 11), the contact portion 16.3.2 being guided, parallel to that movement, towards and against a corresponding conducting path of the circuit board 22 that is again the same conducting path, onto which the first contact end 16.1 of the switching contact 16 is also soldered.

Then, a short circuit in the region of the conducting path facing the switching contact 16, which indicates the end position of the smart card, is effected in the same manner as described above.

The formation of the contact end 16.3 according to FIG. 4 causes the contact end 16.3.2 to be guided slidingly along the corresponding conducting path at the same time so that a self-cleaning effect is additionally obtained.

We claim:

1. A contact block for a smart card reader, comprising:

a contacts carrier having first and second surfaces;

a plurality of contacts disposed in the contacts carrier, said contacts having first ends arranged to contact associated contact paths of a printed circuit and contact portions arranged to project beyond said first surface of the contacts carrier and engage corresponding terminals of a smart card when the smart card is in an end position; and a one-piece switching contact positioned in the contacts carrier, wherein a first portion of the switching contact projects beyond said first surface of the contacts carrier into a path of movement of the smart card into said end position so as to be engaged and moved by the smart card as the smart card is moved to the end position, and a second portion ofthe switching contact is positioned such that the second portion of the switching contact engages a conductive path on said printed circuit as said first portion of the switching contact is engaged and moved by the smart card to thereby indicate that the smart card has been moved into said end position.

2. The contact block according to claim 1, wherein said switching contact extends parallel to said plurality of contacts.

3. The contact block according to claim 1, wherein a first end of the switching contact is bent into a U-shape and a free leg of the U-shape projects beyond and extends parallel to the contacts carrier to secure said first end of the switching contact to the contacts carrier.

4. The contact block according to claim 1, wherein said first and second portions of the switching contact are movable within a groove in said contacts carrier, said groove extending transversely to said first surface of the contacts carrier.

5. The contact block according to claim 4, wherein said groove extends continuously between said first and second surfaces in least in a middle region of the switching contact.

6. The contact block according to claim 1, wherein the second portion of the switching contact extends towards said printed circuit.

7. The contact block according to claim 1, wherein a first fixed end of said switching contact contacts said conductive path of the printed circuit that is engaged by said second portion of the switching contact when said first portion of the switching contact is engaged by said smart card during movement of said smart card to said end position.

8. The contact block according to claim 1, wherein contact portions include middle portions of said plurality of contacts, said middle portions of said plurality of contacts are biased in a direction of engagement with said terminals of said smart card, and second ends of said plurality of contacts rest against first counter bearing portions of said contacts carrier prior to movement of said smart card into said smart card reader.

9. The contact block according to claim 1, wherein said first portion of said switching contact is biased into said path of said smart card such that an end of said switching contact rests against a counter bearing portion of said contacts carrier until said second portion of the switching contact is engaged and moved by said smart card during movement of the smart card to said end position.

* * * * *